United States Patent [19]

Gollan

[11] Patent Number: 4,950,315

[45] Date of Patent: Aug. 21, 1990

[54] MULTIPLE HEAD PUMPING

[75] Inventor: Arye Z. Gollan, Newton, Mass.

[73] Assignee: A/G Technology Corporation, Needham, Mass.

[21] Appl. No.: 379,879

[22] Filed: Jul. 14, 1989

[51] Int. Cl.[5] ............................................. B01D 53/22
[52] U.S. Cl. .......................................... 55/158; 55/356
[58] Field of Search ............................. 55/16, 158, 356

[56] References Cited

U.S. PATENT DOCUMENTS

| | | |
|---|---|---|
| 261,605 | 7/1882 | Hill . |
| 1,623,494 | 4/1927 | Redfield . |
| 1,956,765 | 5/1934 | Jones . |
| 2,628,015 | 2/1953 | Neugebauer et al. . |
| 3,250,080 | 5/1966 | Garwin ................ 55/16 X |
| 3,487,751 | 1/1970 | Meijer et al. ........ 55/16 X |
| 3,692,434 | 9/1972 | Schnear ............... 417/360 |
| 4,119,417 | 10/1978 | Heki et al. ........... 55/16 X |
| 4,140,499 | 2/1979 | Ozaki et al. .......... 55/16 X |
| 4,478,556 | 10/1984 | Gozzi ................... 417/256 |
| 4,560,394 | 12/1985 | McDonald et al. ..... 55/158 X |
| 4,714,411 | 12/1987 | Searle .................. 417/246 |

FOREIGN PATENT DOCUMENTS

| | | |
|---|---|---|
| 31661 | 4/1939 | France . |
| 62-286517 | 12/1987 | Japan ................... 55/158 |
| 201719 | 4/1939 | Switzerland . |
| 0768443 | 10/1980 | U.S.S.R. ............... 55/163 |
| 520521 | 4/1940 | United Kingdom . |
| 2122103 | 1/1984 | United Kingdom ..... 55/158 |

OTHER PUBLICATIONS

Gollan, A. and Kleper, M. H., "Membrane-Based Air Separation", *Symposium Series*, 250, vol. 82, pp. 35-47, 1986.

Thomas Industries Inc. specification sheet.

*Primary Examiner*—Robert Spitzer
*Attorney, Agent, or Firm*—Fish & Richardson

[57] ABSTRACT

Membrane-based gas separation apparatus including a membrane separation device having a feed inlet and outlet and a permeant outlet, a motor, and at least two pump heads driven by the motor, one pump head being connected to supply a feed gas to the feed inlet and another pump head being connected to pull a vacuum at the permeant outlet.

14 Claims, 1 Drawing Sheet

MULTIPLE HEAD PUMPING

BACKGROUND OF THE INVENTION

The invention relates to apparatus driven by pumps, e.g., membrane-based gas separation apparatus.

Membrane-based air separation involves flowing air in a feed channel of a membrane cartridge past one side of a membrane that preferentially passes oxygen over nitrogen through the membrane to a permeant channel in the cartridge on the other side of the membrane. Nitrogen enriched air is removed from the feed channel, and oxygen enriched air is removed from the permeant channel. In a pressurized mode of operation of such separation, a single pump is used to provide compressed air to the feed channel, and oxygen enriched air passes through the membrane to the permeant channel, which is at atmospheric pressure. In a vacuum mode of operation, one pump is again used to provide compressed air to the feed channel (though at a lower pressure than in the pressurized mode), and, in addition, a second pump is used to pull a vacuum in the channel, as is described in Gollan, A. and Kleper, M. H., "Membrane-Based Air Separation", *Symposium Series*, 250, Vol. 82, pp. 35–47, 1986, which is hereby incorporated by reference.

SUMMARY OF THE INVENTION

In one aspect, the invention features in general a multiple-function pump-driven apparatus that employs a motor and at least two diaphragm pump heads that are driven by the motor and are connected to one or more devices that require different pressure levels. In this manner, a single motor can be used to provide pumping for a variety of different functions so long as the power requirements of the motor are not exceeded, avoiding the necessity for more than one motor and the associated expense, weight and space.

In preferred embodiments, one pump head is operating under compression, and the other pump head is operating under vacuum.

In another aspect, the invention features in general a membrane-based gas separation apparatus that includes a motor, at least two pump heads driven by the motor, and a membrane separating device having a feed inlet connected to be supplied with a feed gas from one pump head and a permeant outlet connected to a second pump head used to pull a vacuum at the permeant outlet to remove gas enriched with the gas component being separated (e.g., oxygen). Because the feed pump operates at a high mass flow rate but low pressure increase, and the vacuum pump operates at a larger pressure difference but at a low mass flow rate, the overall power requirements (related to pressure ratio times mass) are low enough to be met by a single motor.

In preferred embodiments, three pump heads can be driven by the motor, the third pump head being in series with the second to pull higher vacuum levels. Two membrane devices can be used, the permeant of a first membrane device being used as the feed for second (e.g., to increase oxygen in the permeant of the second), and the permeant of the second being pulled by two pump heads operating in series. Two membrane devices can also be used with the permeant of the first membrane device being pumped by the second pump head into the feed of the second membrane device, and the permeant of the second membrane device being pulled by the third pump head. Two membrane devices can also be used with the retentate of the first membrane device being used as the feed of the second membrane device (e.g., to increase nitrogen in the retentate of the second), and the permeant of the second membrane device being pulled by the third pump head.

Other advantages and features of the invention will be apparent from the following description of the preferred embodiments thereof and from the claims.

DESCRIPTION OF THE PREFERRED EMBODIMENTS

The preferred embodiments will now be described.

DRAWINGS

STRUCTURE

Figure 1:
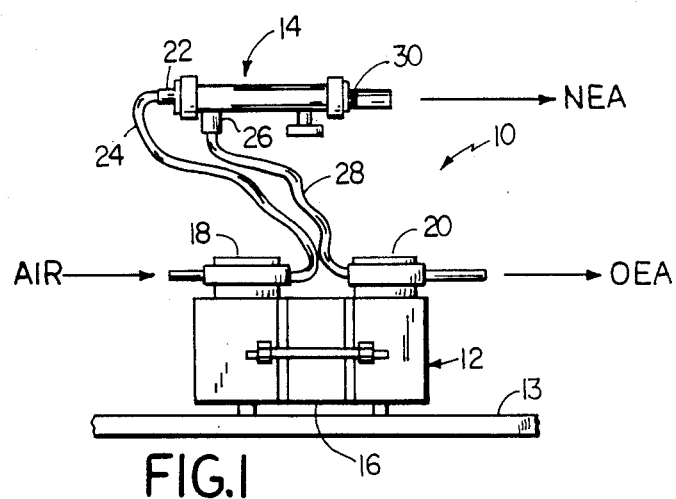
FIG. 1 is a diagram of membrane-based gas separation apparatus according to the invention.

Referring to FIG. 1, there is shown membrane-based gas separation apparatus 10 including pump 12 and membrane separating device 14. Apparatus 10 is contained in a portable enclosure 13, only the bottom wall of which is shown. Pump 12 is a dual-head, single-motor, diaphragm pump available from Thomas Industries Inc., Sheboygan, Wis. under the trade designation 2107CE20 TFE. It includes a single motor 16 and first and second pump heads 18, 20 that employ diaphragms and flap valves and are driven by common motor 16. Membrane device 14 includes hollow fiber semipermeable membranes that preferentially pass oxygen in lieu of nitrogen through membrane walls. Membrane device 14 includes feed inlet 22 connected by hose 24 to the outlet of pump head 18, permeant outlet 26 connected by line 28 to the inlet of pump head 20, and feed outlet (also referred to as "retentate outlet") 30.

Figure 2:
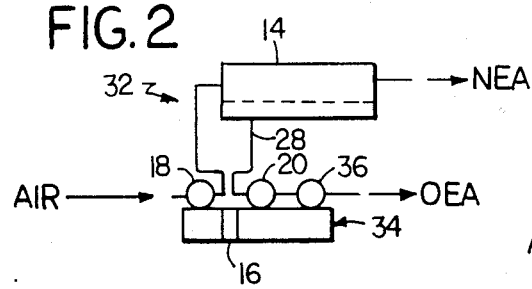
FIG. 2 is a schematic of a first alternative embodiment of membrane-based gas separation apparatus according to the invention.

Referring to FIG. 2, membrane-based gas separation apparatus 32 differs from apparatus 10 in that pump 12 is replaced by pump 34 that includes a third pump head 36 that is also driven by motor 16 and is connected in series with pump head 20.

Figure 3:
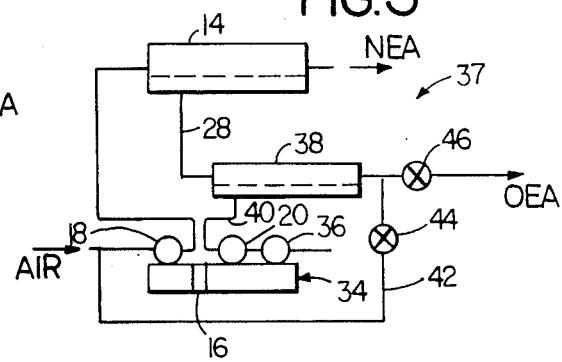
FIG. 3 is a schematic of a second alternative embodiment of membrane-based gas separation apparatus according to the invention.

Referring to FIG. 3, membrane-based gas separation apparatus 37 differs from apparatus 32 in that second membrane separating device 38 is connected to receive the permeant from first membrane separating device 14 as its feed and to supply its permeant over line 40 to pump head 20. In addition, the retentate outlet of membrane device 38 includes optional recirculation line 42 to permit the possibility of recirculation of oxygen-enriched air into the inlet of pump head 18. Valve 44 on line 42 and valve 46 on the effluent line of device 38 can be used to adjust the amount of air that is recirculated and the amount that is discharged.

Figure 4:
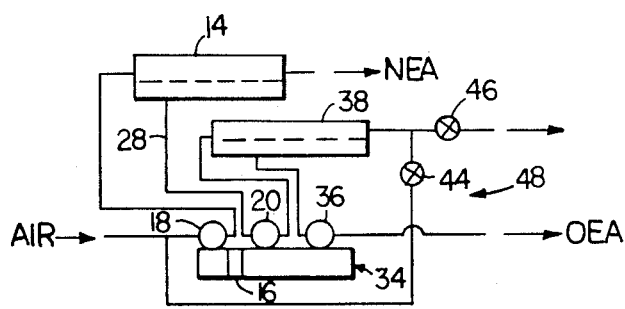
FIG. 4 is a schematic of a third alternative embodiment of membrane-based gas separation apparatus according to the invention.

Referring to FIG. 4, membrane-based gas separation apparatus 48 differs from apparatus 37 in that permeant line 28 is connected to pump head 20, which is in turn connected to the feed inlet of second membrane device 38. The permeant outlet of second membrane device 38 is directly connected to pump head 36. The FIG. 4 embodiment, like that of FIG. 3, uses a second membrane device to increase the oxygen concentration in the permeant of the second membrane device.

Figure 5:
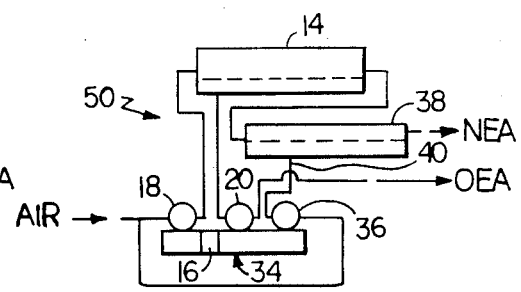
FIG. 5 is a schematic of a fourth alternative embodiment of membrane-based gas separation apparatus according to the invention.

Referring to FIG. 5, membrane-based gas separation apparatus 50 is designed to increase nitrogen concentration in the retentate. Apparatus 50 differs from apparatus 37 and apparatus 48 in that second membrane separating device 38 is connected to receive the retentate from first membrane separating device 14 as its feed and to supply its permeant over line 40 to pump head 36, which, as an option, pumps it to the inlet of pump head 18.

Operation

In operation of the FIG. 1 apparatus, air is pumped by pump head 18 to feed inlet 22 of device 14 and passes through the feed channels of the hollow fiber membranes to feed outlet 30. In the course of passing through device 14, oxygen preferentially passes from the feed channels in the membranes through the membrane walls to the permeant channel and passes out permeant outlet 26. Thus the air that is discharged from retentate outlet 30 is nitrogen enriched air (NEA), and the air pumped from permeant outlet 26 is oxygen enriched air (OEA). The $O_2$ concentration in the OEA is determined by the compression ratio, which is defined as the feed side pressure divided by the permeant side pressure. The power needed to drive the pump heads is a function of the mass pumped times the pressure ratio (i.e., discharge pressure/inlet pressure). Because pump apparatus 10 is operating in the vacuum mode, the difference in pressure between the feed channels and the permeant channel is primarily provided by the vacuum drawn by pump head 20. Pump head 18 operates at a small pressure difference but high mass flow rate and thus draws a small amount of energy, and pump head 20 operates at a much higher pressure difference but has a much smaller mass flow rate through it and therefore also draws small energy. For example, pump head 18 might be increasing the pressure of air from atmospheric pressure to between 1 and 10 psig, and pump head 20 might be developing 22 inches of Hg vacuum (about 4.5 psia) and discharging it at atmospheric pressure. Motor 16 can easily meet the power requirements of pump heads 18, 20 when operating in this mode.

In the FIG. 2 operation, a third pump head 36 is powered by motor 16 and is connected in series with pump head 20 to draw a vacuum on permeant outlet 26. The use of two pump heads in series permits drawing more of a vacuum and thus provides a higher compression ratio and a higher concentration of oxygen in the OEA effluent.

Referring to FIGS. 3 and 4, in these embodiments, two membrane devices are connected in series so that the oxygen enriched permeant of the first membrane device 14 is separated further in second membrane device 38 to obtain a higher concentration of oxygen in the permeant of the second membrane device. In the FIG. 3 configuration, the permeant of the first membrane device is provided without pumping as feed for the second membrane device, and two pump heads 20, 36 are in series to pull a vacuum at the permeant outlet of the second membrane device. In the FIG. 4 configuration, the permeant line for the first membrane device is pumped into the feed of the second device by pump head 20, and the permeant of the second membrane device 38 is pumped by pump head 36. In both of these embodiments the retentate of second device 38 may have a higher oxygen concentration than the supply air, and it can be recirculated to the inlet of pump head 18, by opening valve 44, to increase the concentration of oxygen in the feed. Otherwise it should be vented to the atmosphere.

Referring to FIG. 5, in this embodiment, the two membrane devices are connected with the feed channels in series so that the nitrogen enriched retentate of the first membrane device 14 is further depleted of oxygen in second membrane device 38 to obtain a higher concentration of nitrogen in the final retentate. The permeant of second membrane device 38 may have a higher concentration of nitrogen than the supply air, and for this reason it may be recirculated by third pump head 36 to provide a higher concentration of nitrogen in the feed at the inlet of pump head 18.

Other embodiments of the invention are within the scope of the following claims:

What is claimed is:

1. Membrane-based gas separation apparatus comprising
   a motor,
   at least two pump heads connected to be driven by said motor, and
   one or more membrane separating devices,
      each said device having a semipermeable membrane or membranes that preferentially pass a gas component and divides said device into a feed channel or channels on one side of said membrane or membranes and a permeant channel or channels on the other side of said membrane or membranes, a feed inlet and a feed outlet communicating with said feed channel or channels, and a permeant outlet communicating with said permeant channel,
   one said pump head being connected to one said channel and another said pump head being connected to a different said channel.

2. The apparatus of claim 1 wherein one said pump head is operating under compression, and the other is operating under vacuum.

3. The apparatus of claim 1 wherein said apparatus is portable, and said motor and pump heads are mounted in a portable enclosure.

4. The apparatus of claim 1 wherein said pump heads employ diaphragms and flap valves.

5. Membrane-based gas separation apparatus comprising
   a motor,
   at least two pump heads driven by said motor, and
   a membrane separating device having a semipermeable membrane or membranes that preferentially pass a gas component and divide said device into a feed channel or channels on one side of said membrane or membranes and a permeant channel or channels on the other side of said membrane or membranes, a feed inlet and a feed outlet communicating with said feed channel or channels, and a permeant outlet communicating with said permeant channel,
   one said pump head being connected to supply a feed gas to said feed inlet,
   another said pump head being connected to pull a vacuum at said permeant outlet to remove gas enriched with said gas component.

6. The apparatus of claim 5 further comprising a third pump head driven by said motor, said third pump head being connected in series with said another pump head to pull a vacuum on said permeant outlet.

7. The apparatus of claim 5 further comprising a second membrane separating device having a feed inlet connected to the permeant outlet of said first membrane device.

8. The apparatus of claim 7 wherein said feed inlet of said second membrane device is directly connected to the permeant outlet of said first membrane device, and a permeant outlet of said second membrane device is connected to said another pump head.

9. The apparatus of claim 7 further comprising a third pump head that is driven by said motor and is connected in series with said another pump head.

10. The apparatus of claim 7 wherein said another pump head is used to pump the permeant of the first membrane device and supply it as feed to the second membrane device and further comprising a third pump head that is driven by said motor and is used to pump the permeant out of the second membrane device.

11. The apparatus of claim 5 further comprising a second membrane separating device having a feed inlet connected to the feed outlet of said first membrane device.

12. The apparatus of claim 5 wherein said pump heads employ diaphragms and flap valves.

13. The apparatus of claim 5 wherein said membrane separating device includes hollow-fiber membranes that preferentially transmit oxygen over nitrogen through membrane walls.

14. The apparatus of claim 5 wherein said apparatus is portable, and said motor and pump heads are mounted in a portable enclosure.

* * * * *